United States Patent [19]

Kim et al.

[11] Patent Number: 5,194,569

[45] Date of Patent: Mar. 16, 1993

[54] SYNTHESIS OF BLOCK LIQUID CRYSTAL COPOLYMER

[75] Inventors: Ki-Soo Kim, Katonah, N.Y.; Sophia Dashevsky, Fair Lawn, N.J.; Stanley W. Palmaka, Yonkers, N.Y.

[73] Assignee: Akzo nv, Arnhem, Netherlands

[21] Appl. No.: 779,477

[22] Filed: Oct. 18, 1991

[51] Int. Cl.$^5$ .............. C08G 63/06; C08G 63/02; C08G 63/18; C08F 20/00
[52] U.S. Cl. .............................. 528/206; 528/193; 528/194; 528/271; 528/272; 525/437; 525/444
[58] Field of Search .............. 528/206, 193, 194, 271, 528/272; 525/437, 444

[56] References Cited

FOREIGN PATENT DOCUMENTS 51-033187  3/1976  Japan .
3103431    4/1991  Japan .

OTHER PUBLICATIONS

Ober et al., "*Polymer Journal,*" vol. 14, No. 1, pp. 9-17 (1982).
Yoo et al., "Journal of Appl. Pol. Sci.," vol. 35, 1201-1212 (1988).
Jung-IL Jin, et al. "Journ. of Pol. Sci." vol. 28, 531-543 (1990).

*Primary Examiner*—John Kight, III
*Assistant Examiner*—T. Mosley
*Attorney, Agent, or Firm*—Richard P. Fennelly; Louis A. Morris

[57] ABSTRACT

A single reactor process for formation of block copolymers comprising aromatic ester mesogenic units containing flexible alkane spacers and polyester flexible coil units in the main chain thereof which comprises:
(a) reacting an α, ω-bis(hydroxybenzoyloxy) alkane monomer with an aromatic acid chloride in a reactor to form a functionalized liquid crystal oligomer containing such mesoenic units; and
(b) thereafter reacting the oligomer from (a) in the same reactor with either (i) a polyester oligomer; or (ii) the reagents for synthesizing the polyester oligomer (i).

10 Claims, No Drawings

SYNTHESIS OF BLOCK LIQUID CRYSTAL COPOLYMER

BACKGROUND OF THE INVENTION

C. Ober et al. in Polymer Journal, Vol. 14, No. 1, pp. 9-17 (1982) disclose liquid crystal polymers comprising aromatic ester mesogenic units containing flexible alkylene (or "polymethylene") spacers. For example, one type contains an aromatic ester triad with three linearly-aligned aromatic rings, the bis(p-carboxyphenyl) terephthalate moiety, and a polymethylene flexible spacer which can contain 2 to 10 $CH_2$ groups.

Quite recently, in U.S. Ser. No. 726,601, filed Jul. 8, 1991, which is incorporated herein by reference, thermotropic liquid crystal segmented block copolymers containing mesogenic and flexible coil polymer blocks have been described in which the rod blocks can be the type of liquid crystal polymer moieties described in the Ober et al. publication with the flexible coil moieties being polyester, for example. The synthesis procedure for making the block copolymers, in preferred embodiments, was a two-step reaction. In the first step, a hydroxyl-terminated aromatic mesogenic oligomer was synthesized from terephthaloyl chloride and the desired 1,4-bis(p-hydroxybenzoyloxy) alkane in one reactor and acid chloride-terminated polyester oligomers from terephthaloyl chloride and bis(4-hydroxyalkyl) terephthalate were synthesized in another reactor. In the second step both functionalized oligomers were combined to form the desired block copolymer. This procedure is more complicated than desired since it requires a transfer of one or both of the oligomers to complete the polymerization.

DESCRIPTION OF THE INVENTION

The present invention is a single reactor process for formation of block copolymers comprising aromatic ester mesogenic units containing flexible polymethylene spacers and polyester flexible coil units in the main chain thereof which comprises:

(a) reacting an α,ω-bis(hydroxybenzoyloxy) alkane monomer with an aromatic acid chloride in a reactor to form a functionalized liquid crystal oligomer containing such mesogenic units; and (b) thereafter reacting the oligomer from (a) in the same reactor with either (i) a polyester oligomer; or (ii) the reagents for synthesizing the polyester oligomer (i).

The α,ω-bis(hydroxybenzoyloxy) alkane monomer which can be reacted with the aromatic acid chloride in the first step of the present invention has the formula $$HOArC(O)O(CH_2)_nOC(O)ArOH$$

where Ar is a phenyl ring, n can vary from 2 to 10, and all linkages to the phenyl rings are para.

The aromatic acid chloride is preferably terephthaloyl chloride.

The molar amount of alkane-containing monomer to acid chloride is selected so that a slight excess of either is used depending upon whether a hydroxy-terminated or chloride-terminated oligomer is desired. If a chloride-terminated mesogenic oligomer is desired a slight excess (e.g., 6 mols:5 moles) of acid chloride is used. If hydroxy termination is required, a slight excess of hydroxy-terminated alkane-containing monomer is employed (e.g., 5 moles:4 moles).

The above step will yield an oligomer of the following structure $$HOArC(O)O(CH_2)_nO(O)CAr[OC(O)ArC-(O)OArC(O)O(CH_2)_nOC(O)Ar]_nOH$$

if a hydroxy-terminated species is desired.

In the second step, the oligomer is then reacted either with reagents useful in synthesizing a polyester moiety or with a preformed polyester oligomer.

In the case of the former a diol of the formula $$HO(CH_2)_nOC(O)ArC(O)O(CH_2)_nOH$$

is used with terephthaloyl chloride. If the material from step (I) is hydroxy-terminated, a slight excess of acid chloride is added as a reagent in the second stage. Presence of chloride termination in the first stage oligomer requires a slight excess of the hydroxy reagent in step (2).

In this second stage it is also possible to react oligomeric intermediates from conventional polyester manufacturing processes as the source of the flexible coil segment. A single reactor vessel is used in contrast to the earlier two pot reaction.

The process is further illustrated by the Examples which follow.

EXAMPLE 1

This Example shows the preparation of a triad-4/PBT copolymer with average block sizes of 5 triad-4 terephthalate and 8 BT units in the corresponding blocks.

First, 1,4-bis(p-hydroxybenzoyloxy) monomer (2.66 gm, $8.06 \times 10^{-3}$ mole), terephthaloyl chloride, TACL, (1.31 gm, $6.45 \times 10^{-3}$ mole) and 10 ml of dry 2-chloronaphthalene were added into a 50 ml flask. The reaction mixture was then heated at 200° C. under nitrogen with stirring for twenty-four hours to oligomerize the reactants added in the previous step. Bis(4-hydroxybutyl)terephthalate, BHBT, (2.00 gm, $6.45 \times 10^{-3}$ mole) in 20 ml chloronaphthalene and 20 ml methylene chloride were then slowly added. Meantime, methylene chloride was distilled off. TACL (1.64 gm, $8.06 \times 10^{-3}$ mole) in 15 ml chloronaphthalene was slowly added. Then, the solution temperature was increased to 245° C. and was maintained for twenty hours. The polymer solution was cooled to room temperature and was added to 100 ml methanol. The mixture was stirred for twenty minutes, and polymer was collected by filtration. The polymer was further purified by Soxhlet extraction with methanol for twenty-four hours and was then dried in a vacuum oven at 100° C. for twenty-four hours. The amount of copolymer recovered was 5.8 gm, and it had a Tm of 242° C., as determined by polarizing optical microscope (POM), and an inherent viscosity of 0.29 dL/gm in 1/1 (wt/wt) p-chlorophenol/1,1,2,2-tetrachloroethane at 25° C.

COMPARATIVE EXAMPLE 2

First BHBT (2.00 gm), TACL (1.64 gm) and 10 ml chloronaphthalene were added to flask I, and 1,4-bis(p-hydroxybenzoyloxy) butane monomer (2.66 gm), TACL (1.31 gm) and 10 ml chloronaphthalene were added to flask II. Both flasks were heated at 200° C. under nitrogen with stirring for five hours. The oligomers prepared in both flasks were then mixed together and kept at 245° C. for fifty hours. The product was recovered as in Example 1. Four grams of polymer was obtained, and it had an inherent viscosity of 0.29 dL/gm and a Tm of 240° C.

EXAMPLE 3

First, 1,4-bis(p-hydroxybenzoyloxy) butane monomer (2.66 gm, $8.06 \times 10^{-3}$ mole), TACL (1.31 gm, $6.45 \times 10^{-3}$ mole), and 10 ml of dry chloronaphthalene were added to a 50 ml flask. The reaction mixture was heated at 210° C. under argon with stirring for twenty-four hours. Then, BHBT oligomer (Degree of Polymerization=7, 2.26 gm) and triphenylphosphine oxide (0.06 gm) was added and TACL (0.656 gm, $3.23 \times 10^{-3}$ mole) in 5 ml chloronaphthalene was slowly added with stirring. Then, polymerization was continued for another twenty-four hours. Product was recovered as described in Example 1. The polymer had an inherent viscosity of 0.42 dL/gm in 1/1 (by wt) p-chlorophenol/TCE at 25° C. and a Tm of 210° C. by DSC and 230° C. by POM.

EXAMPLE 4

Into a 2 liter flask were added 82.6 gm (0.25 mole) of 1,4-bis(p-hydroxybenzoyloxy) butane monomer, 60.9 gm (0.30 mole) of TACL, and 330 ml of dry 2-chloronaphthalene. The resulting mixture was heated at 210° C. under nitrogen with stirring for forty-five hours to oligomerize the reactants. Then, 62.1 gm (0.20 mole) of BHBT in 250 ml of methylene chloride was slowly added. Meanwhile, methylene chloride was distilled off. TACL (30.5 gm, 0.15 mole) in 230 ml of chloronaphthalene was then slowly added. Thereafter, the solution temperature was increased to 245° C. and was maintained at that temperature for sixteen hours. The polymer solution that resulted was cooled to room temperature and was added to 750 ml of methanol. The resulting mixture was stirred for twenty minutes and polymer product was collected by filtration. The polymer was further washed with methanol and was then dried in a vacuum oven at 100° C. for twenty-four hours. The block copolymer that was recovered (195 gm) had a Tm of 220° C. by polarizing microscopy and an inherent viscosity of 0.51 dl/g in 6/4 (wt/wt) p-chlorophenol/1,1,2,2-tetrachloroethane at 25° C.

EXAMPLE 5

Into a 100 ml flask were added: 1,4-bis(p-hydroxybenzoyloxy) butane (6.60 gm, 0.02 mole), TACL (4.87 gm, 0.024 mole), pyridine (4.0 gm) and tetrachloroethane, TCE, (20 ml). The mixture was heated at 110° C. under nitrogen with stirring for six and one-half hours. Bis(4-hydroxyethyl) terephthalate, BHET, (5.12 gm, 0.02 mole) in 20 ml TCE was added, and then TACL (3.25 gm, 0.016 mole) in 20 ml TCE was slowly added. The reaction mixture was kept at that temperature for sixteen hours. The polymer solution was cooled to room temperature and added to 150 ml of methanol. The copolymer was recovered by filtration and was dried in a vacuum oven at 100° C. for twenty-four hours. The amount of copolymer recovered was 14.2 gm and had a Tm of 199° C. by polarizing microscope and an inherent viscosity of 0.23 dL/gm.

EXAMPLE 6

Into a 50 ml flask were added: 1,2-bis(p-hydroxybenzoyloxy) ethane (2.01 gm, 0.0067 mole), TACL (1.63 gm, 0.008 mole), and 15 ml chloronaphthalene. The reaction mixture was heated at 220°-230° C. for eighteen hours under nitrogen. Then, BHET (1.70 gm, 0.0067 mole) was added. Thereafter, TACL (1.08 gm, 0.0053 mole) in 15 ml chloronaphthalene was slowly added with stirring. The polymerization was continued for an additional eight hours. The amount of copolymer recovered, as in Example 5, was 5 gm and it had a Tm of 235° C.

The foregoing should not be construed in a limiting sense since only certain embodiments are taught thereby. The scope of protection sought is set forth in the claims which follow.

We claim:

1. A single reactor process for formation of block copolymers comprising aromatic ester mesogenic units containing flexible alkane spacers and polyester flexible coil units in the main chain thereof which comprises:
   (a) reacting an $\alpha,\omega$-bis(hydroxybenzoyloxy) alkane monomer with an aromatic acid chloride in a reactor to form a functionalized liquid crystal oligomer containing such mesogenic units; and
   (b) thereafter reacting the oligomer from (a) in the same reactor with either (i) a polyester oligomer; or (ii) the reagents for synthesizing the polyester oligomer (i).

2. A process as claimed in claim 1 wherein the aromatic ester mesogenic units are of the formula $$-[OArC(O)O(CH_2)_nO(O)CArO(O)CArC(O)]-$$

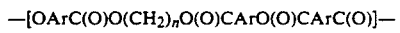

where Ar is phenylene and n is an integer of from about 2 to 10.

3. A process as claimed in claim 2 wherein n is 4.
4. A process as claimed in claim 2 wherein n is 2.
5. A process as claimed in claim 1 wherein the polyester flexible coil unit is of the formula $$-[O(CH_2)_mOC(O)ArC(O)O(CH_2)_mOC(O)ArC(O)]-$$

wherein Ar is phenylene and m is lower alkyl.

6. A process as claimed in claim 5 wherein m is 4.
7. A process as claimed in claim 5 wherein m is 2.
8. A process as claimed in claim 2 wherein the polyester flexible coil unit is of the formula $$-[-O(CH_2)_mOC(O)ArC(O)O(CH_2)_mOC(O)ArC(O)-]-$$

wherein Ar is phenylene and m is lower alkyl.

9. A process as claimed in claim 8 wherein m is 4.
10. A process as claimed in claim 8 wherein m is 2.

* * * * *